(12) United States Patent
Palan et al.

(10) Patent No.: US 10,326,708 B2
(45) Date of Patent: Jun. 18, 2019

(54) CLOUD COMPUTING SERVICES FRAMEWORK

(71) Applicants:Oracle International Corporation, Redwood Shores, CA (US); Kiran Palan, Santa Clara, CA (US); Alexandre Hardy, Cape Town (ZA)

(72) Inventors: Kiran Palan, Santa Clara, CA (US); Alexandre Hardy, Cape Town (ZA)

(73) Assignee: Oracle International Corporation, Redwood Shores, CA (US)

( * ) Notice: Subject to any disclaimer, the term of this patent is extended or adjusted under 35 U.S.C. 154(b) by 74 days.

(21) Appl. No.: 14/377,811

(22) PCT Filed: Feb. 7, 2013

(86) PCT No.: PCT/US2013/025186
§ 371 (c)(1),
(2) Date: Aug. 8, 2014

(87) PCT Pub. No.: WO2013/119841
PCT Pub. Date: Aug. 15, 2013

(65) Prior Publication Data
US 2016/0197843 A1 Jul. 7, 2016

Related U.S. Application Data

(60) Provisional application No. 61/597,610, filed on Feb. 10, 2012.

(51) Int. Cl.
*G06F 15/16* (2006.01)
*H04L 12/911* (2013.01)
(Continued)

(52) U.S. Cl.
CPC .......... *H04L 47/746* (2013.01); *G06F 9/5072* (2013.01); *H04L 47/745* (2013.01); *H04L 67/16* (2013.01)

(58) Field of Classification Search
CPC .......................... H04L 29/08144; H04L 29/06
(Continued)

(56) References Cited

U.S. PATENT DOCUMENTS 4,086,628 A 4/1978 Woodrum
5,239,648 A 8/1993 Nukui
(Continued)

FOREIGN PATENT DOCUMENTS

CN 101969475 2/2011
CN 102223398 A 10/2011
(Continued)

OTHER PUBLICATIONS

U.S. Appl. No. 13/299,262, Non-Final Office Action dated Nov. 17, 2014, 14 pages.
(Continued)

*Primary Examiner* — Douglas B Blair
(74) *Attorney, Agent, or Firm* — Kilpatrick Townsend & Stockton LLP

(57) ABSTRACT

Methods and systems of managing computer resources in a cloud environment. Receiving, via at least one server, cloud management instructions via an API, coordinating, via the at least one server, with at least one cloud services manager via a distributed coordination and messaging service. The coordination includes instructions regarding the cloud services manager managing at least one cloud resource, and communicating with at least one database to store and retrieve the management instructions.

15 Claims, 6 Drawing Sheets

(51) Int. Cl.
*G06F 9/50* (2006.01)
*H04L 29/08* (2006.01)

(58) Field of Classification Search
USPC .......................................................... 709/226
See application file for complete search history.

(56) References Cited

U.S. PATENT DOCUMENTS

| | | | |
|---|---|---|---|
| 5,463,774 | A | 10/1995 | Jenness |
| 5,832,505 | A | 11/1998 | Kasso et al. |
| 6,038,399 | A | 3/2000 | Fisher et al. |
| 6,047,129 | A | 4/2000 | Frye |
| 6,473,800 | B1 | 10/2002 | Jerger et al. |
| 6,772,350 | B1 | 8/2004 | Belani et al. |
| 6,944,777 | B1 | 9/2005 | Belani et al. |
| 7,200,865 | B1 | 4/2007 | Roscoe et al. |
| 7,225,210 | B2 | 5/2007 | Guthrie, II |
| 7,366,793 | B2 | 4/2008 | Kenner et al. |
| 7,475,419 | B1 | 1/2009 | Basu et al. |
| 7,602,756 | B2 | 10/2009 | Gu et al. |
| 7,631,306 | B1 | 12/2009 | Puig et al. |
| 7,734,643 | B1 | 6/2010 | Waterhouse et al. |
| 7,886,038 | B2 | 2/2011 | Ferris |
| 7,890,626 | B1 | 2/2011 | Gadir |
| 7,921,452 | B2 | 4/2011 | Ridion et al. |
| 7,953,823 | B2 | 5/2011 | Rider et al. |
| 7,958,246 | B2 | 6/2011 | Barber |
| 8,037,108 | B1 | 10/2011 | Chang |
| 8,086,177 | B2 | 12/2011 | Trift et al. |
| 8,108,377 | B2 | 1/2012 | Jiang et al. |
| 8,112,505 | B1 | 2/2012 | Ben-Shaul et al. |
| 8,201,175 | B2 | 6/2012 | Zhu |
| 8,209,415 | B2 | 6/2012 | Wei |
| 8,291,079 | B1 * | 10/2012 | Colton ................. G06F 9/5061 709/223 |
| 8,341,141 | B2 | 12/2012 | Krislov |
| 8,347,263 | B1 | 1/2013 | Offer |
| 8,429,162 | B1 | 4/2013 | Wang et al. |
| 8,438,654 | B1 | 5/2013 | von Eicken et al. |
| 8,464,250 | B1 | 6/2013 | Ansel |
| 8,468,455 | B2 | 6/2013 | Jorgensen et al. |
| 8,472,438 | B2 | 6/2013 | Kini et al. |
| 8,495,611 | B2 | 7/2013 | McCarthy et al. |
| 8,504,689 | B2 | 8/2013 | Ferris et al. |
| 8,509,231 | B2 | 8/2013 | Hoole et al. |
| 8,577,937 | B1 | 11/2013 | Offer |
| 8,584,215 | B2 | 11/2013 | Narasimha et al. |
| 8,650,152 | B2 | 2/2014 | Dettinger et al. |
| 8,850,528 | B2 | 9/2014 | Van Biljon et al. |
| 8,938,540 | B2 | 1/2015 | Van Biljon et al. |
| 8,977,679 | B2 | 3/2015 | Van Biljon et al. |
| 9,021,009 | B2 | 4/2015 | Van Biljon et al. |
| 9,032,069 | B2 | 5/2015 | Van Biljon et al. |
| 9,076,168 | B2 | 7/2015 | Van Biljon et al. |
| 9,087,352 | B2 | 7/2015 | Van Biljon et al. |
| 9,171,323 | B2 | 10/2015 | Van Biljon et al. |
| 9,202,239 | B2 | 12/2015 | Van Biljon et al. |
| 9,218,616 | B2 | 12/2015 | Van Biljon et al. |
| 9,232,000 | B1 | 1/2016 | Pittman |
| 2002/0052941 | A1 | 5/2002 | Patterson |
| 2002/0097747 | A1 | 7/2002 | Kirkby et al. |
| 2003/0018927 | A1 | 1/2003 | Gadir et al. |
| 2003/0037284 | A1 | 2/2003 | Srinivasan et al. |
| 2003/0105810 | A1 | 6/2003 | McCrory et al. |
| 2003/0229623 | A1 | 12/2003 | Chang et al. |
| 2004/0024892 | A1 | 2/2004 | Creswell et al. |
| 2004/0184070 | A1 | 9/2004 | Kiraly et al. |
| 2004/0250120 | A1 | 12/2004 | Ng |
| 2005/0038834 | A1 | 2/2005 | Souder et al. |
| 2005/0055306 | A1 | 3/2005 | Miller et al. |
| 2005/0065855 | A1 | 3/2005 | Geller |
| 2005/0187937 | A1 | 8/2005 | Kawabe et al. |
| 2005/0193218 | A1 | 9/2005 | Susser et al. |
| 2005/0278441 | A1 | 12/2005 | Bond et al. |
| 2006/0112176 | A1 | 5/2006 | Liu et al. |
| 2006/0209868 | A1 | 9/2006 | Callaghan |
| 2006/0212545 | A1 | 9/2006 | Nichols et al. |
| 2006/0259947 | A1 | 11/2006 | Aarnos et al. |
| 2007/0072591 | A1 | 3/2007 | McGary et al. |
| 2007/0162456 | A1 | 7/2007 | Agassi et al. |
| 2007/0234332 | A1 | 10/2007 | Bundridge et al. |
| 2007/0255798 | A1 | 11/2007 | Schneider |
| 2008/0052203 | A1 | 2/2008 | Beyer et al. |
| 2008/0195760 | A1 | 8/2008 | Nudler |
| 2008/0228734 | A1 | 9/2008 | Kang |
| 2008/0295094 | A1 | 11/2008 | Korupolu et al. |
| 2008/0316980 | A1 | 12/2008 | Ahlen et al. |
| 2009/0024522 | A1 | 1/2009 | Reunert et al. |
| 2009/0172662 | A1 | 7/2009 | Liu |
| 2009/0182622 | A1 | 7/2009 | Agarwal et al. |
| 2009/0210429 | A1 | 8/2009 | Agrawal et al. |
| 2009/0228950 | A1 * | 9/2009 | Reed ................. H04L 63/0807 726/1 |
| 2009/0235342 | A1 | 9/2009 | Manion et al. |
| 2009/0240728 | A1 | 9/2009 | Shukla et al. |
| 2009/0276771 | A1 | 11/2009 | Nickolov et al. |
| 2009/0300210 | A1 | 12/2009 | Ferris |
| 2009/0300350 | A1 | 12/2009 | Gai et al. |
| 2009/0319529 | A1 | 12/2009 | Bartlett et al. |
| 2009/0327471 | A1 | 12/2009 | Astete et al. |
| 2010/0036736 | A1 | 2/2010 | McGee et al. |
| 2010/0042720 | A1 | 2/2010 | Stienhans et al. |
| 2010/0061391 | A1 | 3/2010 | Sindhu et al. |
| 2010/0070501 | A1 | 3/2010 | Walsh et al. |
| 2010/0071035 | A1 | 3/2010 | Budko et al. |
| 2010/0083004 | A1 | 4/2010 | Kirshenbaum |
| 2010/0114714 | A1 | 5/2010 | Vitek |
| 2010/0161717 | A1 | 6/2010 | Albrecht |
| 2010/0169477 | A1 | 7/2010 | Stienhans et al. |
| 2010/0180014 | A1 | 7/2010 | Kannan et al. |
| 2010/0185455 | A1 | 7/2010 | Miller |
| 2010/0194963 | A1 | 8/2010 | Terashima |
| 2010/0197267 | A1 | 8/2010 | Raleigh |
| 2010/0198972 | A1 | 8/2010 | Umbehocker |
| 2010/0217840 | A1 | 8/2010 | Dehaan et al. |
| 2010/0223385 | A1 | 9/2010 | Gulley et al. |
| 2010/0250748 | A1 | 9/2010 | Sivasubramanian et al. |
| 2010/0250956 | A1 | 9/2010 | Reed et al. |
| 2010/0251242 | A1 | 9/2010 | Sivasubramanian et al. |
| 2010/0269109 | A1 | 10/2010 | Cartales |
| 2010/0274769 | A1 | 10/2010 | Hazlewood et al. |
| 2010/0275059 | A1 | 10/2010 | Hazlewood et al. |
| 2010/0318645 | A1 | 12/2010 | Hoole et al. |
| 2010/0332629 | A1 | 12/2010 | Cotugno et al. |
| 2011/0016214 | A1 | 1/2011 | Jackson |
| 2011/0022652 | A1 | 1/2011 | Lai et al. |
| 2011/0022812 | A1 | 1/2011 | van der Linden et al. |
| 2011/0055034 | A1 | 3/2011 | Ferris et al. |
| 2011/0055378 | A1 | 3/2011 | Ferris et al. |
| 2011/0055399 | A1 | 3/2011 | Tung et al. |
| 2011/0055712 | A1 | 3/2011 | Tung et al. |
| 2011/0078679 | A1 | 3/2011 | Bozek et al. |
| 2011/0096174 | A1 | 4/2011 | King et al. |
| 2011/0099146 | A1 | 4/2011 | McAlister et al. |
| 2011/0106875 | A1 | 5/2011 | Koenig |
| 2011/0119381 | A1 | 5/2011 | Glover et al. |
| 2011/0126047 | A1 | 5/2011 | Anderson et al. |
| 2011/0126168 | A1 | 5/2011 | Ilyayev |
| 2011/0126197 | A1 | 5/2011 | Larsen et al. |
| 2011/0185063 | A1 | 7/2011 | Head et al. |
| 2011/0191610 | A1 | 8/2011 | Agarwal et al. |
| 2011/0209064 | A1 | 8/2011 | Jorgensen et al. |
| 2011/0213687 | A1 | 9/2011 | Ferris et al. |
| 2011/0214124 | A1 | 9/2011 | Ferris et al. |
| 2011/0225299 | A1 | 9/2011 | Nathuji et al. |
| 2011/0225467 | A1 | 9/2011 | Betzler et al. |
| 2011/0231525 | A1 | 9/2011 | Balani et al. |
| 2011/0231899 | A1 | 9/2011 | Pulier et al. |
| 2011/0243553 | A1 | 10/2011 | Russell |
| 2011/0246253 | A1 | 10/2011 | Yu et al. |
| 2011/0246984 | A1 | 10/2011 | Sharp et al. |
| 2011/0258692 | A1 | 10/2011 | Morrison et al. |
| 2011/0265081 | A1 | 10/2011 | Lucovsky et al. |
| 2011/0265147 | A1 | 10/2011 | Liu |

(56) References Cited

U.S. PATENT DOCUMENTS

| | | | |
|---|---|---|---|
| 2011/0265164 A1* | 10/2011 | Lucovsky | G06F 9/45533 726/7 |
| 2011/0270721 A1 | 11/2011 | Kusterer | |
| 2011/0270968 A1 | 11/2011 | Salsburg et al. | |
| 2011/0282832 A1 | 11/2011 | Rishel et al. | |
| 2011/0282940 A1* | 11/2011 | Zhang | G06F 9/5072 709/204 |
| 2011/0295999 A1 | 12/2011 | Ferris et al. | |
| 2011/0296019 A1 | 12/2011 | Ferris et al. | |
| 2011/0307391 A1 | 12/2011 | Mercuri et al. | |
| 2011/0307899 A1 | 12/2011 | Lee et al. | |
| 2012/0017112 A1 | 1/2012 | Broda et al. | |
| 2012/0030069 A1 | 2/2012 | Garg et al. | |
| 2012/0030672 A1 | 2/2012 | Zygmuntowicz et al. | |
| 2012/0047239 A1* | 2/2012 | Donahue | G06F 9/5072 709/220 |
| 2012/0072985 A1 | 3/2012 | Davne et al. | |
| 2012/0078849 A1 | 3/2012 | Bryant et al. | |
| 2012/0079276 A1 | 3/2012 | Evans et al. | |
| 2012/0096158 A1 | 4/2012 | Astete et al. | |
| 2012/0110055 A1 | 5/2012 | Van Biljon et al. | |
| 2012/0110056 A1 | 5/2012 | Van Biljon et al. | |
| 2012/0110180 A1 | 5/2012 | Van Biljon et al. | |
| 2012/0110188 A1 | 5/2012 | Van Biljon et al. | |
| 2012/0110636 A1 | 5/2012 | Van Biljon et al. | |
| 2012/0110650 A1 | 5/2012 | Van Biljon et al. | |
| 2012/0110651 A1 | 5/2012 | Van Biljon et al. | |
| 2012/0116937 A1 | 5/2012 | Van Biljon et al. | |
| 2012/0117229 A1 | 5/2012 | Van Biljon et al. | |
| 2012/0124211 A1 | 5/2012 | Kampas et al. | |
| 2012/0150791 A1 | 6/2012 | Willson | |
| 2012/0185913 A1* | 7/2012 | Martinez | G06F 9/455 726/1 |
| 2012/0221603 A1 | 8/2012 | Kothule et al. | |
| 2012/0246646 A1 | 9/2012 | Bakman | |
| 2012/0259815 A1 | 10/2012 | Olson | |
| 2012/0310880 A1 | 12/2012 | Giampaolo et al. | |
| 2012/0310991 A1 | 12/2012 | Frantz et al. | |
| 2013/0019015 A1* | 1/2013 | Devarakonda | G06F 9/5072 709/226 |
| 2013/0030853 A1 | 1/2013 | Agarwal et al. | |
| 2013/0036213 A1 | 2/2013 | Hasan et al. | |
| 2013/0060839 A1 | 3/2013 | Van Biljon et al. | |
| 2013/0125217 A1 | 5/2013 | Edwards et al. | |
| 2013/0173798 A1 | 7/2013 | Micucci et al. | |
| 2015/0006482 A1 | 1/2015 | Hardy et al. | |
| 2015/0120936 A1 | 4/2015 | Palan et al. | |
| 2015/0264121 A1 | 9/2015 | Van Biljon et al. | |

FOREIGN PATENT DOCUMENTS

| | | |
|---|---|---|
| CN | 103488697 | 1/2014 |
| CN | 104303175 | 1/2015 |
| CN | 104335179 | 2/2015 |
| CN | 105339940 A | 2/2016 |
| CN | 104335179 B | 1/2018 |
| CN | 104303175 | 6/2018 |
| EP | 2583211 | 4/2013 |
| EP | 2812809 | 12/2014 |
| EP | 2815346 | 12/2014 |
| EP | 3014485 | 5/2016 |
| JP | 2015507301 | 3/2015 |
| JP | 2015512091 | 4/2015 |
| JP | 2016524255 | 8/2016 |
| JP | 6231020 | 11/2017 |
| WO | 2009151729 | 12/2009 |
| WO | WO2011159842 A2 | 12/2011 |
| WO | 2011159842 | 3/2012 |
| WO | 2012167108 | 12/2012 |
| WO | 2013119841 | 8/2013 |
| WO | 2013122815 | 8/2013 |
| WO | 2014209848 | 12/2014 |

OTHER PUBLICATIONS

U.S. Appl. No. 13/299,157 Non-Final Office Action dated Dec. 3, 2014, 10 pages.
U.S. Appl. No. 13/299,206 Notice of Allowance dated Dec. 19, 2014, 10 pages.
U.S. Appl. No. 13/299,319 Notice of Allowance dated Jan. 13, 2015, 9 pages.
U.S. Appl. No. 13/299,301, Final Office Action dated Jan. 29, 2015, 13 pages.
U.S. Appl. No. 13/299,262, Notice of Allowance dated Mar. 3, 2015, 10 pages.
U.S. Appl. No. 13/299,157, Notice of Allowance dated Feb. 27, 2015, 9 pages.
U.S. Appl. No. 13/299,066, Non-Final Office Action dated Mar. 19, 2015, 17 pages.
U.S. Appl. No. 13/299,339, Notice of Allowance dated Apr. 21, 2015, 17 pages.
U.S. Appl. No. 14/459,104 3rd Party Submission mailed on May 29, 2015, 14 pages.
International Preliminary Report on Patentability for application PCT/US2013/025211 (dated Aug. 28, 2014).
U.S. Appl. No. 13/299,066, Final Office Action dated Jul. 18, 2014, 19 pages.
U.S. Appl. No. 13/299,335, Notice of Allowance dated Jul. 18, 2014, 7 pages.
U.S. Appl. No. 13/299,339, Non-Final Office Action dated Sep. 3, 2014, 8 pages.
U.S. Appl. No. 13/299,287, Notice of Allowance dated Sep. 16, 2014, 16 pages.
U.S. Appl. No. 13/299,335, Notice of Allowance dated Sep. 15, 2014, 10 pages.
International Application No. PCT/US2011/040590, International Preliminary Report on Patentability dated Jan. 3, 2013, 11 pages.
International Application No. PCT/US2013/025186, International Preliminary Report on Patentability dated Aug. 21, 2014, 6 pages.
U.S. Appl. No. 13/299,287, Corrected Notice of Allowability dated Oct. 15, 2014, 2 pages.
U.S. Appl. No. 13/299,335, Corrected Notice of Allowability dated Oct. 6, 2014, 4 pages.
U.S. Appl. No. 13/299,339, Notice of Allowance dated Jun. 27, 2014, 17 pages.
"A White Paper from the Open Cloud Standards", Interoperable Clouds, Version: 1.0.0, Nov. 11, 2009, pp. 1-21.
"Managing VMware VirtualCenter Roles and Permissions", Retrieved from the Internet: URL:http://www.vmware.com/pdf/vi3_vc_roles.pdf, Apr. 4, 2007, 15 pages.
"VMware Virtual Networking Concepts", Retrieved from the internet: https://www.vmware.com/files/pdf/virtual_networking_concepts.pdf, Jul. 18, 2007, 12 pages.
Danwei et al., "Access Control of Cloud Service Based on UCON", Cloud Computing, Springer Berlin Heidelberg, Dec. 1, 2009, pp. 559-564.
EP11796398.3, "Extended European Search Report", dated May 25, 2016, 14 pages.
EP11796398.3, "Partial Supplementary European Search Report", dated Apr. 7, 2016, 6 pages.
EP13746545.6, "Extended European Search Report", dated Apr. 26, 2016, 8 pages.
Fitzpatrick, "Tonido Keeps Cloud Computing Local", Retrieved from the Internet: URL:http:f/lifehacker.com/5208833/tonido-keeps-cloud-computing-local, Apr. 13, 2009, 2 pages.
Thain et al., "Distributed Computing in Practice: The Condor Experience", Concurrency and Computation: Practice and Experience, vol. 17, Jan. 1, 2005, 37 pages.
U.S. Appl. No. 14/226,557, "Non-Final Office Action", dated May 19, 2016, 9 pages.
U.S. Appl. No. 14/459,104 , "Non-Final Office Action", dated May 20, 2016, 28 pages.
U.S. Appl. No. 14/724,043, "Non-Final Office Action", dated Jun. 16, 2016, 24 pages.
International Search Report for application PCT/US2013/025186 (dated Apr. 19, 2013).

(56) References Cited

OTHER PUBLICATIONS

International Search Report for application PCT/US2013/025211 (dated Apr. 16, 2013).
International Search Report for application PCT/US11/040590 (dated Jan. 5, 2012).
Karjoth, Gunter, "Access Control with IBM Trivoli Access", May 2003, IBM Research, Zurich Research Laboratory, vol. 6, No. 2.
Canetti et al. "Practical delegation of computation using multiple servers," CCS '11 Proceedings of the 18th ACM conference on Computer and communications security, pp. 445-454(Oct. 2011).
U.S. Appl. No. 13/299,004, Non-Final Office Action dated Apr. 15, 2013, 58 pages.
U.S. Appl. No. 13/299,004, Final Office Action dated Oct. 2, 2013, 42 pages.
U.S. Appl. No. 13/299,066 Non-Final Office Action dated Apr. 12, 2013, 26 pages.
U.S. Appl. No. 13/299,066, Final Office Action dated Oct. 22, 2013, 25 pages.
U.S. Appl. No. 13/299,157, Non-Final Office Action dated May 24, 2013, 14 pages.
U.S. Appl. No. 13/299,157 Final Office Action dated Dec. 5, 2013, 9 pages.
U.S. Appl. No. 13/299,262, Non-Final Office Action dated May 2, 2013, 12 pages.
U.S. Appl. No. 13/299,262, Final Office Action dated Oct. 30, 2013, 11 pages.
U.S. Appl. No. 13/299,287, Non-Final Office Action dated Oct. 28, 2013, 18 pages.
U.S. Appl. No. 13/299,335, Non-Final Office Action dated Nov. 22, 2013, 24 pages.
U.S. Appl. No. 13/299,339, Non-Final Office Action dated Nov. 16, 2012, 12 pages.
U.S. Appl. No. 13/299,339, Final Office Action dated Aug. 7, 2013, 16 pages.
U.S. Appl. No. 13/299,066, Non-Final Office Action dated Mar. 12, 2014, 16 pages.
U.S. Appl. No. 13/299,004, Notice of Allowance dated Mar. 24, 2014, 22 pages.
U.S. Appl. No. 13/299,335, Notice of Allowance dated May 1, 2014, 7 pages.
U.S. Appl. No. 13/299,206, Non-Final Office Action dated May 22, 2014, 10 pages.
U.S. Appl. No. 13/299,287, Final Office Action dated May 23, 2014, 12 pages.
U.S. Appl. No. 13/299,301, Non-Final Office Action dated Jun. 12, 2014, 18 pages.
U.S. Appl. No. 13/299,319, Non-Final Office Action dated Jun. 6, 2014, 13 pages.
European Search Report for Application No. EP 13748986 dated Sep. 8, 2015, 7 pages.
International Preliminary Report on Patentability for Application No. PCT/US2014/043599, dated Jan. 7, 2016, 8 pages.
International Search Report and Written Opinion for Application No. PCT/US2014/043599, dated Oct. 14, 2014, 11 pages.
U.S. Appl. No. 13/299,066, Notice of Allowance dated Jul. 31, 2015, 23 pages.
U.S. Appl. No. 13/299,301, Notice of Allowance dated Jun. 12, 2015, 5 pages.
U.S. Appl. No. 13/299,339, Advisory Action dated Oct. 18, 2013, 2 pages.
Baron Schwartz et al., "High Performance MySQL: Optimization, Backups, Replication, and More", Jun. 2008, pp. 428-429.
Liu et al., "NIST Cloud Computing Reference Architecture", NIST Special Publication 500-292, Sep. 8, 2011, 35 pages.
M-T Schmidt et al., "The Enterprise Service Bus: Making service-oriented acrchitecture real", IBM Systems Journal, vol. 44, No. 4, Oct. 1, 2005, pp. 781-797.
U.S. Appl. No. 14/226,557, Notice of Allowance dated Nov. 25, 2016, 9 pages.
U.S. Appl. No. 14/724,043, Non-Final Office Action dated Dec. 30, 2016, 12 pages.
U.S. Appl. No. 14/459,104, Final Office Action dated Dec. 2, 2016, 43 pages.
Chinese Application No. 201380014187.4, Office Action dated May 27, 2016, 14 pages (6 pages of Original document and 8 pages of English Translation).
U.S. Appl. No. 14/724,043, Notice of Allowance dated May 19, 2017, 19 pages.
Chinese Application No. 201380014187.4, Office Action dated Feb. 4, 2017, 7 pages (3 pages for the original document and 4 pages for the English translation).
Chinese Application No. 201380014746.1, Office Action dated Mar. 27, 2017, 12 pages.
Japanese Application No. 2014-556691, Office Action dated Jan. 31, 2017, 8 pages (4 pages for the original document and 4 pages for the English translation).
U.S. Appl. No. 14/459,104, "Non-Final Office Action", dated Oct. 18, 2017, 37 pages.
CN201380014187.4, "Office Action", dated Aug. 17, 2017, 15 pages.
JP2014-556683, "Office Action", dated Oct. 17, 2017, 5 pages.
European Application No. 11796398.3, Office Action dated Aug. 8, 2017, 4 pages.
European Application No. 13746545.6, Summons to Attend Oral Proceedings mailed on Apr. 25, 2018, 11 pages.
Japanese Application No. 2014-556683, Office Action dated Jun. 5, 2018, 6 pages (3 pages of the original document and 3 pages of the English translation).
U.S. Appl. No. 15/692,929, Non-Final Office Action dated Jun. 14, 2018, 10 pages.
Chinese Application No. 201480036405.9, Office Action dated Jun. 15, 2018, 15 pages (6 pages of the original document and 9 pages of the English translation).
European Application No. 14740064.2, Office Action dated Aug. 8, 2018, 7 pages.
Hewitt, Cassandra—The Definitive Guide, Distributed Data at web Scale, O'Reilly, ISBN: 978-1-449-39041-9, Nov. 2010, 330 pages.
Japanese Application No. 2016-523825, Office Action dated Jul. 31, 2018, 4 pages (3 pages of the original document and 1 pages of the English translation).
U.S. Appl. No. 14/459,104, Advisory Action dated Aug. 28, 2018, 7 pages.
U.S. Appl. No. 14/459,104, Non-Final Office Action dated Jan. 11, 2019, 27 pages.
U.S. Appl. No. 15/692,929, Notice of Allowance dated Jan. 9, 2019, 10 pages.
European Application No. 11796398.3, Office Action dated Dec. 3, 2018, 4 pages.
European Application No. 13748986.0, Office Action dated Apr. 24, 2018, 8 pages.
European Application No. 11796398.3, Office Action dated Mar. 26, 2018, 5 pages.
U.S. Appl. No. 14/459,104, Final Office Action dated May 1, 2018, 28 pages.

* cited by examiner

CLOUD COMPUTING SERVICES FRAMEWORK

CROSS-REFERENCE TO RELATED APPLICATIONS

This application is a U.S. National Stage application that claims priority under 35 U.S.C. 371 to PCT Application No. PCT/US2013/025186, filed on Feb. 7, 2013, titled "CLOUD COMPUTING SERVICES FRAMEWORK", which claims the benefit and priority under 35 U.S.C. 119(e) from U.S. Provisional Application No. 61/597,610, filed Feb. 10, 2012, titled "CLOUD COMPUTING SERVICES FRAMEWORK".

TECHNICAL FIELD

The present invention relates to cloud computing. More particularly, the present invention relates to a framework of coordinating and automating processes in cloud computing.

BACKGROUND

Cloud computing is a way for users to store data and operate computational processes on infrastructure connected by a network. Thus, instead of having to purchase physical infrastructure, users send processes and data out to be run and stored on infrastructure owned by other entities. The user only pays for the amount of data storage or processing capability that he or she desires. This allows the user to tap computing resources that would be impossible without owning actual, physical and vast computing resources.

By its very nature, cloud computing gives developers large tool sets for executing programs and tasks along with database storage but it also creates logistical hurdles to implementing those numerous programs, tasks and storage. For instance, developers may be required to write repetitive daemons for cloud managers and object managers to program the logistics each time an object or process is run. This equates to extra work for developers who must devote great resources on cloud logistics, separate and apart from the development of the actual end product.

SUMMARY

Systems and method of managing computer resources in a cloud environment, may comprise receiving, via at least one server, cloud management instructions via an API. Also, coordinating, via the at least one server, with at least one cloud services manager via a distributed coordination and messaging service, wherein the coordination includes instructions regarding the cloud services manager managing at least one cloud resource, and communicating with at least one database to store and retrieve the management instructions.

The systems and methods may also include where the cloud services manager includes at least a cloud services framework, and an API. They may also include where the cloud services manager is further configured to establish and control at least one cloud resource.

Some example systems and methods include where the cloud services manager is located in the cloud. Also, where a controller is configured to interact with the cloud services manager.

Other examples may include where the controller is configured to communicate with the cloud services framework via the API and the cloud services framework is configured to validate the controller. Also where the controller is a cloud resource.

Further examples include where the at least one cloud resource is at least one of a Virtual Machine, an Operating System and a physical computational device. And where the controller is further configured to instantiate at least one cloud service based on parameters entered by a user.

Still other examples include where the controller instantiates at least one cloud service via a start daemon via the API. And where the cloud services framework is configured to scale the at least one cloud resource. Also, where the cloud services framework is configured to request redundant cloud resources in order to replace failed resources. And wherein the API is configured to be dynamically extended by adding services to the cloud.

Other embodiments include where the cloud resource is, or is a combination of, a virtual machine, a physical machine, an operating system, storage service, networking service, and an application service.

BRIEF DESCRIPTION OF THE DRAWINGS

For a better understanding of the systems and methods described in this application, reference should be made to the description below, in conjunction with the following drawings, in which.

DETAILED DESCRIPTION

Figure 1:
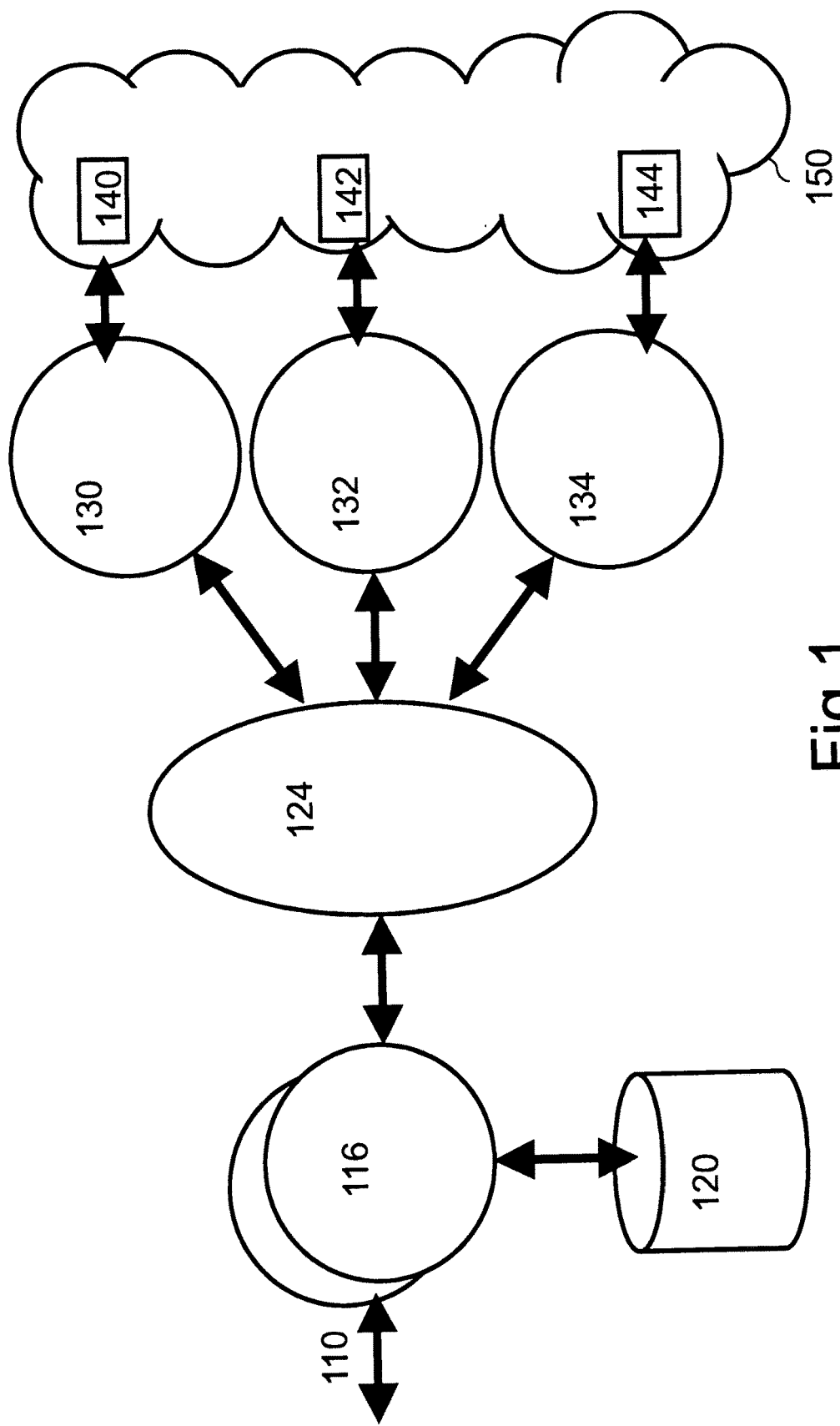
FIG. 1 is a schematic illustrating in overview, the cloud computing system, according to some embodiments.

In the following detailed descriptions, numerous specific details are set forth to illustrate the subject matter presented in this document. It will, however, be apparent to one of ordinary skill in the art that the subject matter may be practiced without these exact specific details. Moreover, the descriptions are provided by way of example and should not be used to limit the scope of any later claimed inventions.

Computer networks of many kinds exist today. Closed and proprietary networks, open and public networks, and hybrid networks as well. These networks tie together computer servers and databases in ways that allow computer programs to run efficiently. Some embodiments of such networks are known as "cloud computing." Over such a network, such as the internet, computer resources such as infrastructure, platforms and applications can all be used by client users. The physical resources of such cloud networks may be scattered around various physical locations, but by being networked together, can become a larger resource. Various systems and methods can be used to manage the resources that can be hosted and run on such a cloud network.

Cloud Services Framework (CSF) technology described herein, is a set of cloud management tools that aims to manage the resources for logistical cloud infrastructures.

CSF abstracts the logistical cloud coordination in order to replicate it and template it for multiple uses.

CSF facilitates the object/process to pass through the cloud management system to the end Cloud Services Manager (CSM) that works with the cloud environment and resources found there. This system bypasses individualized processing of each object as each are loaded. Instead, CSF is able to handle the underlying logistics while maintaining ambivalence to the individual processes. CSF implements logistics such as backup, scalability, redundancy, fail-safes, placement of services across multiple clouds and security of the cloud environment, without separate developer coding for each process individually.

CSF accomplishes this by allowing developers to set Cloud Service Controllers (Controllers) that define Cloud Service Specification (CSS). These CSSs define how clients or Computational Resources (CRs) are to be managed, essentially pre-programming the logistics of the cloud management for each particular service.

CRs could be any computational resource including but not limited to Virtual Machines (VMs), Operating System (OS) containers, or actual physical computational machines.

CSSs become the Application Programming Interface (API) template for later usage and automatically become commands at the Command Line Interface (CLI) and User Interface (UI) levels. Thus, the Controller implements a simple interface with only a few APIs.

With CSSs, a developer can program coordination, networking, storage, permissions and other cloud objects with the CRs running on the cloud without having to write the actual code to do so. The result is easier implementation of the coordination and running of CRs, networking, storage, permissions and other cloud objects, and ensures that CRs run as the developer intended. Another result is that a developer can concentrate on the actual Cloud Service he or she wants to provide without having to worry about other logistical details.

Cloud Resource is inclusive but not limited to the following, virtual machine, physical machine or a OS container, any Storage services provided a private or public cloud, any Networking services provided by private or public cloud, any feature that is provided by the private or public cloud, any higher level application services like load balancers, AutoScaling, DNS, Platform As a Service (PaaS) provided by the cloud vendor or $3^{rd}$ party cloud service developers.

Overview

CSF is a set of cloud management tools that can allow for the replication and automation of Cloud Services logistics. This reduces the amount of time developers have to program those logistics individually, each time a service is created.

Logistics include, but are not limited to coordination and running of the CRs, networking cloud resources, storage, permissions, backup, scalability, redundancy, fail-safes, placement of services across multiple clouds and security of the cloud environment.

CSF allows the object/process to pass through the system and handles the underlying logistics of the cloud(s) while maintaining ambivalence to the individual processes. CSF accomplishes this by allowing developers to set Cloud Service Controllers that define CSSs.

These CSSs become the API interface templates for later usage and automatically become commands at the CLI and UI levels.

CSSs define object coordination, networking, storage, permissions and other cloud objects. CSF uses APIs to implement the services/objects defined in the CSSs. The result is easier and faster implementation of the coordination and running of CRs, networking, storage, permissions and other cloud objects, and ensures that CRs run as the developer intended. Another result is that the developer can concentrate on the actual Cloud Service he or she wants to provide without having to worry about other logistical details.

Cloud Servies Framework

Cloud Services Framework aims to reduce the amount of time developers need to manage their client CRs. Through the APIs, developers create a set of Cloud Service Controllers. Cloud Service Controllers are the "software/process/daemon" that implement CSF web APIs/Interfaces. They may be written in any programming paradigm and can be added dynamically by the end user or developer to extend the cloud and add functionality.

Cloud Service Controllers define the CSSs. These CSSs become the API interface template for later implementation. Thus, the Controller implements a simple interface with only a few APIs to run complex cloud processes and coordination.

FIG. 1 depicts one example embodiment of how CSF operates to manage cloud resources.

In this example embodiment, CSF uses an API 110 to communicate with one or more Site Services Managers 116. This user API 110 could be a Restful API, an http based web language with requests similar to fetching a web page. Alternative APIs include Web APIs and standards like Simple Object Access Protocol (SOAP).

Continuing with FIG. 1, one or many Site Services Managers 116 communicate with a database 120 or distributed data store (DDS) and with one or more individual Cloud Services Managers, 130, 132, 134, over a Distributed Coordination and Messaging Service 124 (DC Messaging Service).

The individual Cloud Services Managers, 130, 132, 134, use Controllers 140, 142, 144, to carry out processes in the cloud 150.

Alternatively, The individual Cloud Services Managers 130, 132, 134, can be implemented within their own CRs in the cloud 150 as well.

Cloud Service Specifications (CSSs)

A Cloud Service is an instantiation of a CSS. Developers can customize the CSSs in any way they desire to manage and control desired CRs on the cloud. Multiple services can even be combined in one model.

Developers define CSSs as a set of Service Parameters. Users enter the Service Parameters to initiate a particular service. The Service Parameters are labeled by the developer so users can recognize what is required for each input field.

Once established, the CSS automatically populates in the API, CLI and the UI as a new feature/extension for that cloud implementation so end users can recognize the new feature.

When an end user wants to launch a service, a user calls that particular service using the API. When an end user (or another Cloud Service) uses a cloud service, it actually instantiates a cloud service for its consumption.

The user is presented with the set of defined parameter labels from the CSS and the user enters the parameter values for the desired service. The Service Parameters are entered and added to the DDS. The Service Parameters are validated according to the CSS.

Service Parameters specify how a Cloud Service should be instantiated. The CSF provides the instruments, or APIs, to coordinate cloud resources, saving information in the DDS allowing for many clouds to be utilized and auto scaling of cloud resources.

Once the Service Parameters are saved in the DDS, the DC Messaging Service is notified. The DC Messaging Service assigns the Service Parameters an identifier and puts that identifier into a registry. Each Cloud Services Manager is also assigned an identifier. The DC Messaging Service, using the respective identifiers, assigns a Service Parameter to a particular Cloud Services Manager. The Cloud Services Manager is assigned an instantiation of the Cloud Service according to the load by the Load Balancer or Site Manager according to the load.

Once the Cloud Services Manager has the Service Parameter values, it matches them to a type/class registry that define the different type/class services. The Cloud Services Manager also performs a set of validations on the fetched Service Parameters.

After validated and matched, the Manager can begin executing the service and launch CRs in the cloud, in accordance with the instantiation of CSS or Cloud Service Parameters specified by the user.

Cloud Services Manager and the Cloud

Figure 2:
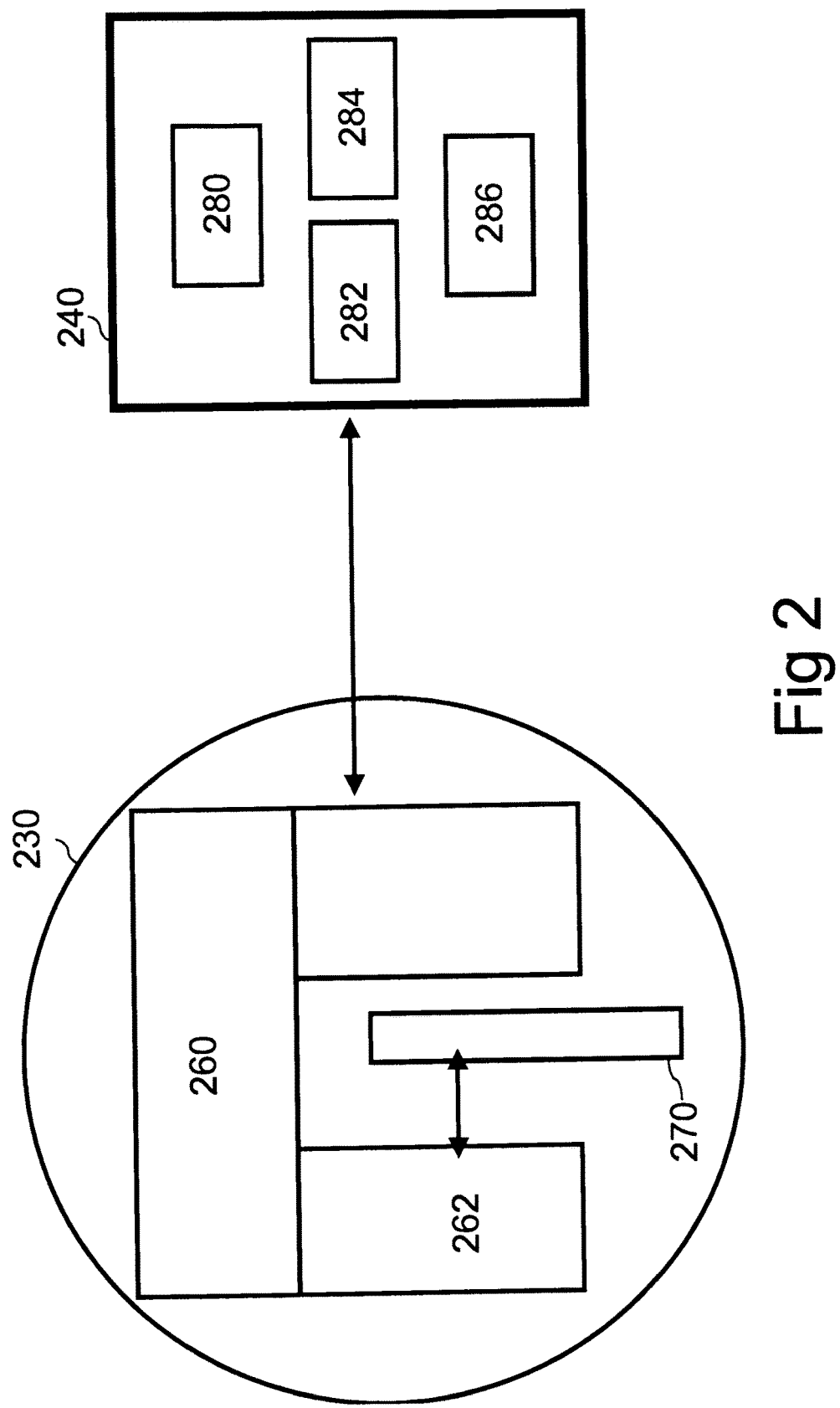
FIG. 2 is a schematic illustrating the CSF embodiment interacting with the cloud environment, according to some embodiments.

An example embodiment of how CSF is arranged and works is described with reference to FIG. 2. As shown in FIG. 2, a Cloud Services Manager 230 includes the CSF 260. A Controller 270 is depicted as being added to the cloud. The CRs 280, 282, 284, 286, are depicted in the cloud box 240.

The Controller 270 communicates with the CSF 260 through APIs 262. In some embodiments, a Controller 270 can run in its own CR 280 which includes Virtual Machines, its own Operating System (OS) container or actual physical computational device.

Once added, the Cloud Services Manager 230 validates the Controller 270.

The Controller 270 instantiates the Cloud Service based on the parameters entered by the user. To begin, a "start" daemon is communicated from the CSF 260 to the cloud. The Controller 270 can choose to start a daemon on the CR 280 via the APIs 262 provided by the CSF 260.

Once received, CRs 280 are loaded in the cloud and the Controller 270 is informed through an "add_client" notification. Handles that corresponds to the specific CR 280 are assigned. Once a handle is assigned to a CR, 280 that handle is used for later communication with the Controller 270, and to invoke the CR API 262 to manage the CRs 280.

With the CR handle provided as part of "add_client" call, the Controller 270 can set up the CR 280 to provide the service or sub-set of a service. There are many such services but examples include a webserver, memory cache, and load-balancer.

Many multiple CRs 280 can be loaded and instantiated in this way, depending on the desires of the user and the arrangement the Controller 270 requests.

Additionally, other cloud features can be similarly utilized. For example, user specified storage and public IF could be managed by the Cloud Service to make the service resilient and publically available. The CSF 260 provides the APIs 262 necessary to manage CRs 280, storage, networking, security resources which could exist in multiple private or public clouds, or both private and public clouds.

Not only multiple processes but any kind of process may be instantiated this way. For example, storage may be attached to a CR 280, persistent public IP may be assigned, config files may be loaded or any other number of APIs 262.

CSF 260 provides APIs 262 for the Controller to save statistics and information about the Cloud Service in a persistent data store so that users can access that information. The information/data can be used to make changes to the services, add services, remove services, start and stop CRs 280.

The user decides when to delete the Cloud Service that the user instantiated. When users request the Cloud Service instantiation to go away, then all the cloud resources created by the framework and the Controller 270 are cleaned up. "Stop" API implemented by the Controller 270 is called to indicate that the service instantiation is stopped.

Auto Scalability

Figure 3:
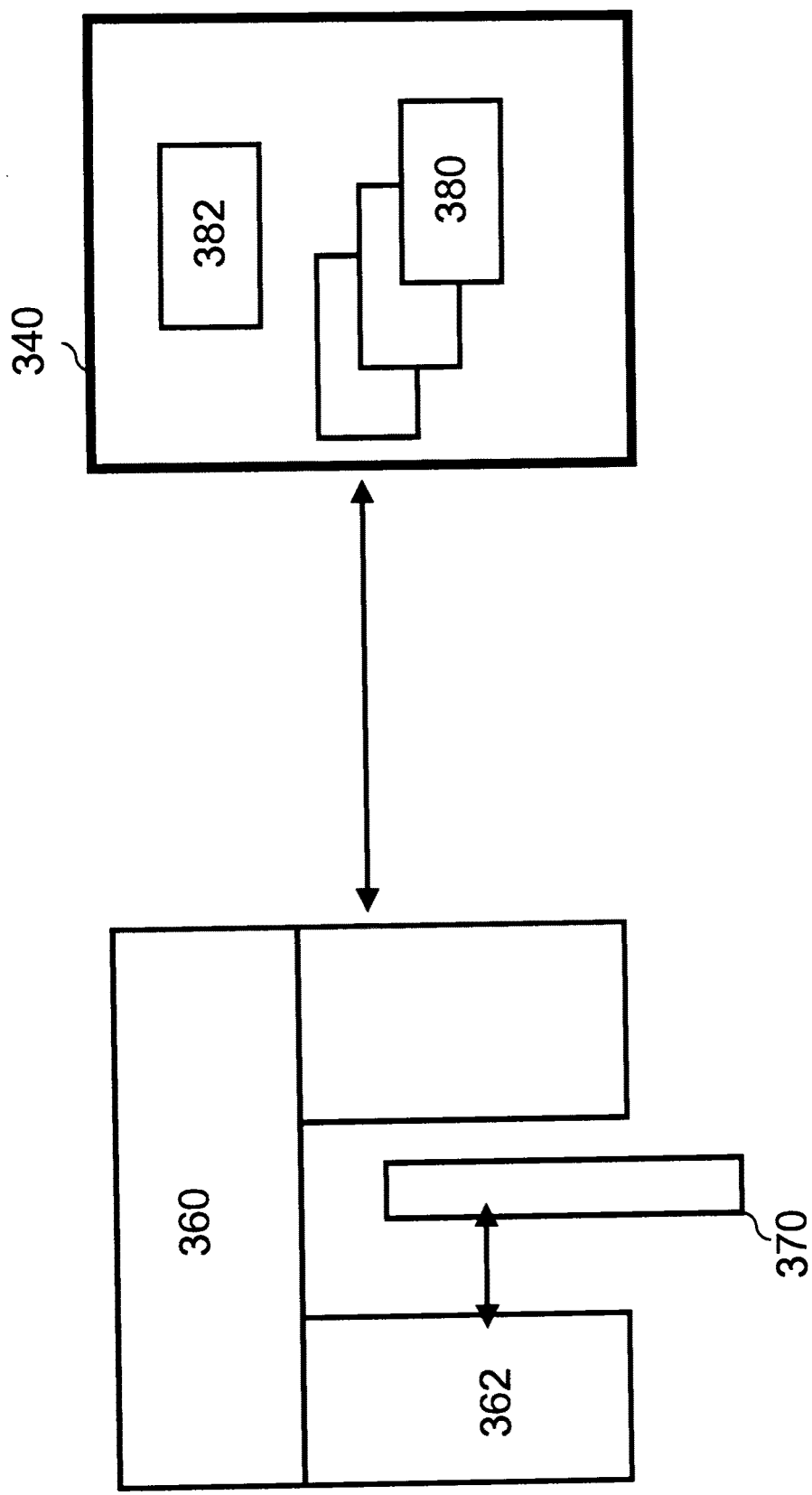
FIG. 3 is an illustration of Auto scaling on the cloud in a CSF environment, according to some embodiments.

CSF can be programmed to automatically scale cloud usage up or down depending on criteria determined by a developer. New CRs can be launched or existing ones taken down depending on the needs of the user which allows for efficient usage of cloud resources. This is depicted in FIG. 3 by showing many of the same type of CR 380 utilized by the CSF 360.

For example, a developer can initially call three CRs 380 to be web servers. Based on the load criteria determined by the developer, CSF 360can prepare more or fewer servers for future use. The Controller 370can monitor the cloud service. The CSF 360 provides APIs 362 to help with that monitoring. When a particular threshold is met, specific to the cloud service, the Controller 370 can request to scale up or down via APIs 362 provided by the CSF 360, in this example, adding or removing web servers depending on the load.

In another example, the Controller 370 monitors the cloud service. The Controller 370 requests to scale up based on some criteria by sending a notification to the Service API 362. A new CR 380 is created and launched in the cloud. The Service API 362 informs the Controller 370 of the new CR 380 by communicating an "add_client" notification. Likewise, if the Controller 370 asks the Service API 362 to scale down, the VM is removed, the Service API 362 informs the Controller 370 by passing a "remove_client" notification.

In still another example, where in a typical cloud environment utilizing CSF 360and running a load balancing/proxy, two Apache servers and a MySQL database, another server is needed. The Cloud Service application monitors the cloud. When the load on the web servers trips a threshold value, the Controller sends a Scale Up notification to the Service API. A new VM is created and launched into the cloud. The Service API 362 notifies the Controller 370 by sending an Add-Client notification. The new VM becomes a new Apache server to handle the large load and the Controller sends a config file to the new server and a reconfigure proxy to the cloud. The new server is then integrated into the cloud system.

These parameters are fully customizable by the Controller and implemented by the cloud through the CR APIs.

Cloud Services Framework Defers Processing

CSF can instantiate services/use CRs and not have to understand or process the specific CR code until late in the process. Thus, as depicted in FIG. 1, the Site Manager, DDS, and DC Messaging Service do not have to process the service code. It is not until the service or CR reaches the individual Cloud Services Controller that the actual understanding of the particular service code is necessary.

CSF coordinates the delegation of the service to a particular Cloud Services Manager by assigning an identifier to the service parameter and storing it in the DDS. Thus, the CSF parameters are initially passed all the way to the Controller, while keeping the rest of the underlying infrastructure from understanding the specifics of the service parameter.

The result is a generic front-end handling processes and a delay of handling the internal code of the service until it reaches the end Cloud Services Manager to be handled by the Controller.

Delaying of processing of code allows CSF to genericize and automate the logistics. Logistics include, but are not limited to coordination and running of the CRs, networking cloud resources, storage, permissions, backup, scalability, redundancy, fail-safes, placement of services across multiple clouds and security of the cloud environment.

High Availability

Figure 4:
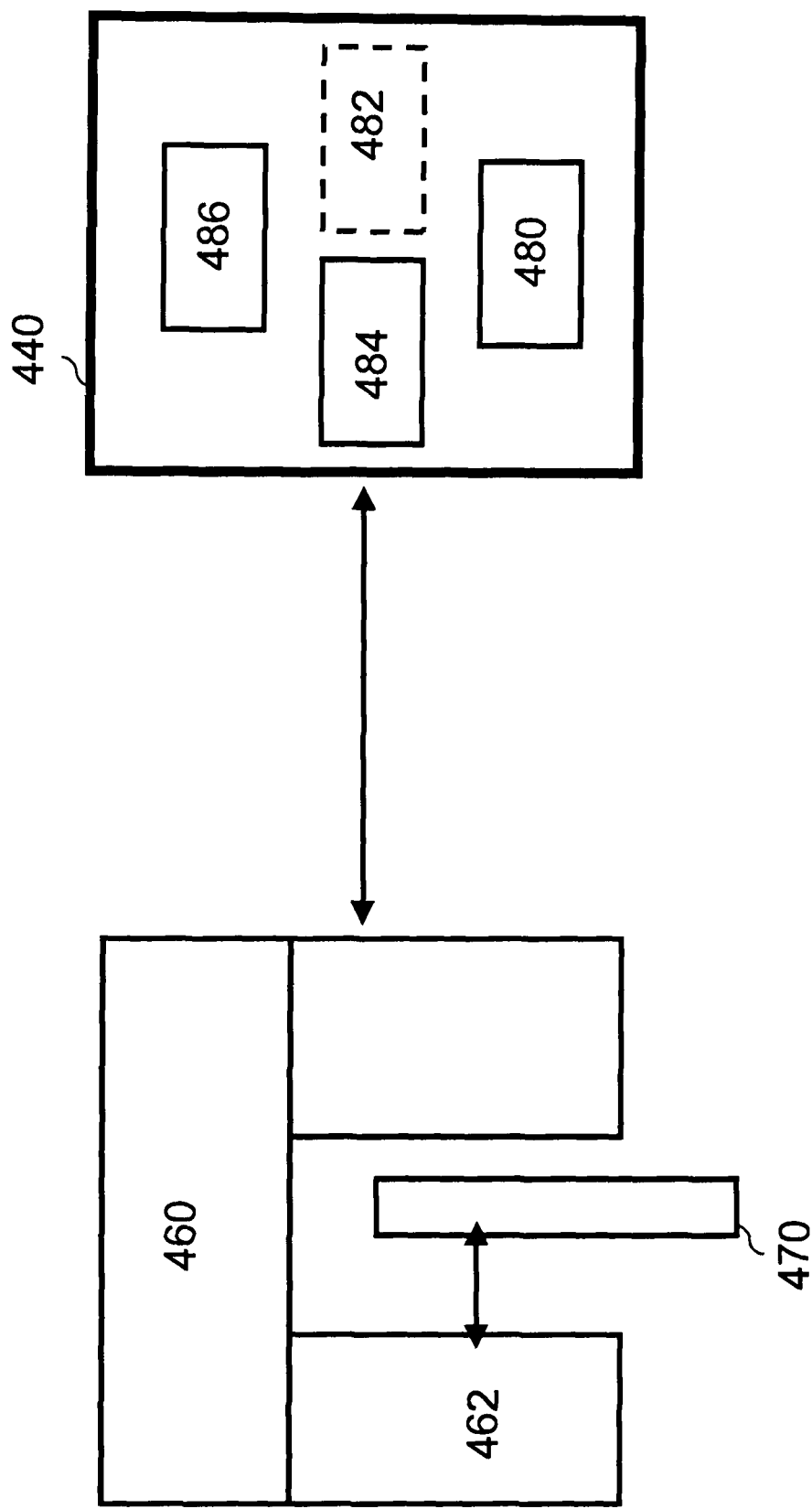
FIG. 4 is an illustration of High Availability on the cloud in a CSF environment, according to some embodiments.

With respect to FIG. 4, CSF 460 allows for High Availability (HA) of Cloud Services. HA is the ability for cloud resources to be automatically redundant for fail-safe purposes but also for adaptability of services.

CSF 460 can be programmed using HA aspects in order to automatically assign a new CR to take over for a failed machine. It can promote CR 480 already in use to take over for failed CRs 482.

When a CR dies or becomes unavailable, the Controller 470 is notified via the "remove_client" API. Another CR is automatically arranged for and the Controller 470 is notified via the "add client" API.

In one example, HA also allows for developers to choose how redundant and fail-safe they want their processes to be. Multiple redundancies can be requested by the Controller 470. This is depicted in FIG. 4 with a newly generated CR 480 replacing a dead one 482. Because cloud computing is typically billed by usage, more redundancies cost more money, but CSF allows users to program automatic redundancies that are not used until needed.

Figure 5:
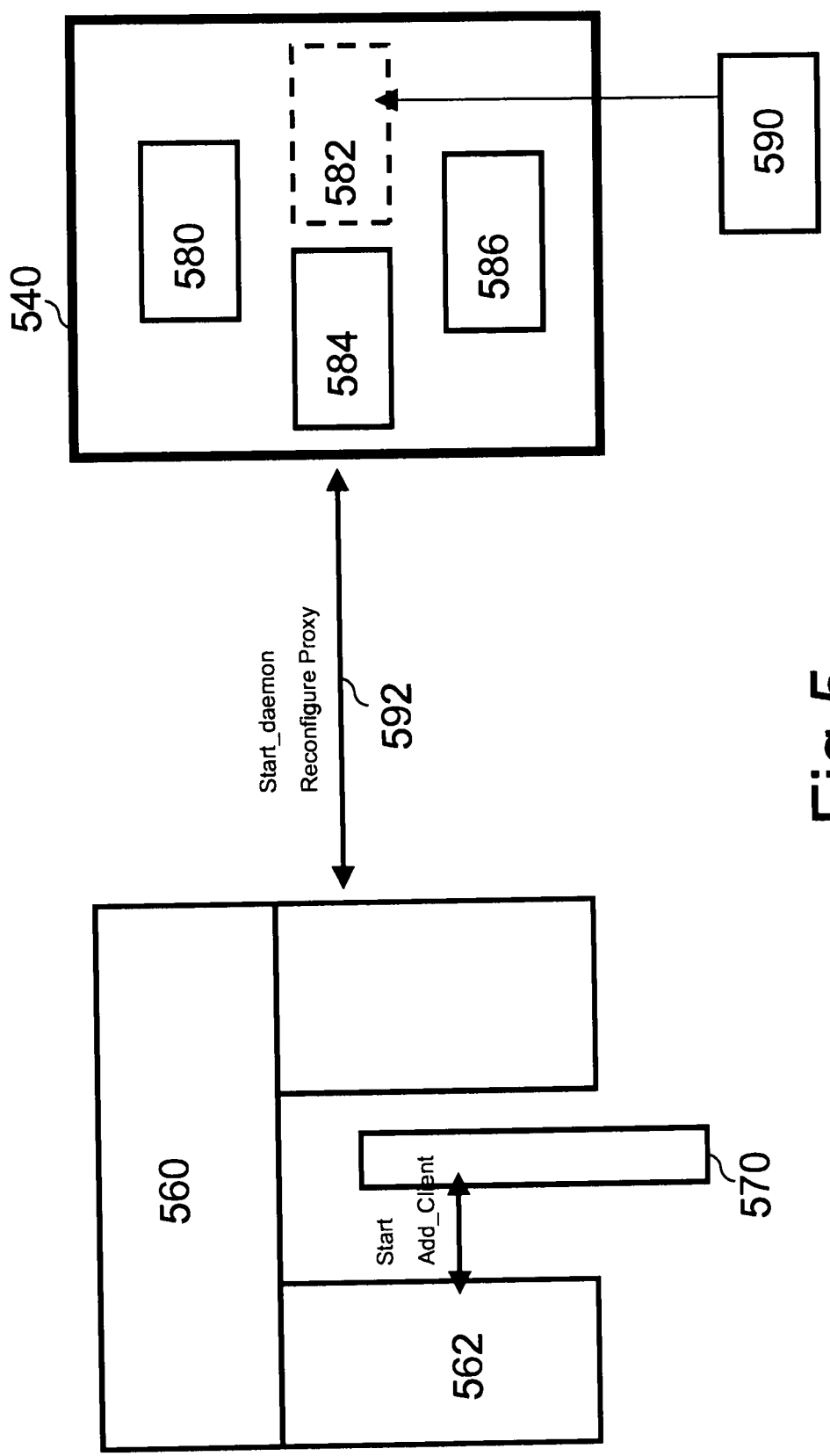
FIG. 5 is an illustration of High Availability on the cloud in a CSF environment, according to some embodiments.

Referring to FIG. 5, that depicts a more detailed and specific example of HA. For instance, in a cloud environment, a CR can die or become unavailable. If that happens, the Cloud Service Controller 570 is notified by passing a "remove_client" notification from the Service API 562 and a new CR is automatically launched to cover for the dead or unavailable one. Then, the Controller is notified that the new CR is up by the Service API 562 sending the Controller 570 an Add-Client notification.

In this example, the cloud environment utilizing CSF 560, is running a Load Balancer/Proxy 580, two Apache servers 582, 584 and a MySQL database 586. If one Apache server 582 dies or becomes unavailable, a "remove_client" notification is sent from the Service API 562 to the Controller 570. A Reconfigure Proxy 592 communication is sent from the client API to the cloud 540. A new CR 590 is created to take the place of the failed one and it is launched. The Controller 570 is notified by an Add-Client 592 notification from the Service API 562. Another Reconfigure Proxy is communicated to the CRs.

Still another example demonstrates how existing CRs can be reconfigured to the role of a dead or unavailable CR. Redundant CRs can run simultaneously and IP and Storage is reattached if the first CR goes down and the redundant CR is promoted. These instructions are all programmed into the CSS logistical coordination.

CSF with a Load Balancer

Figure 6:
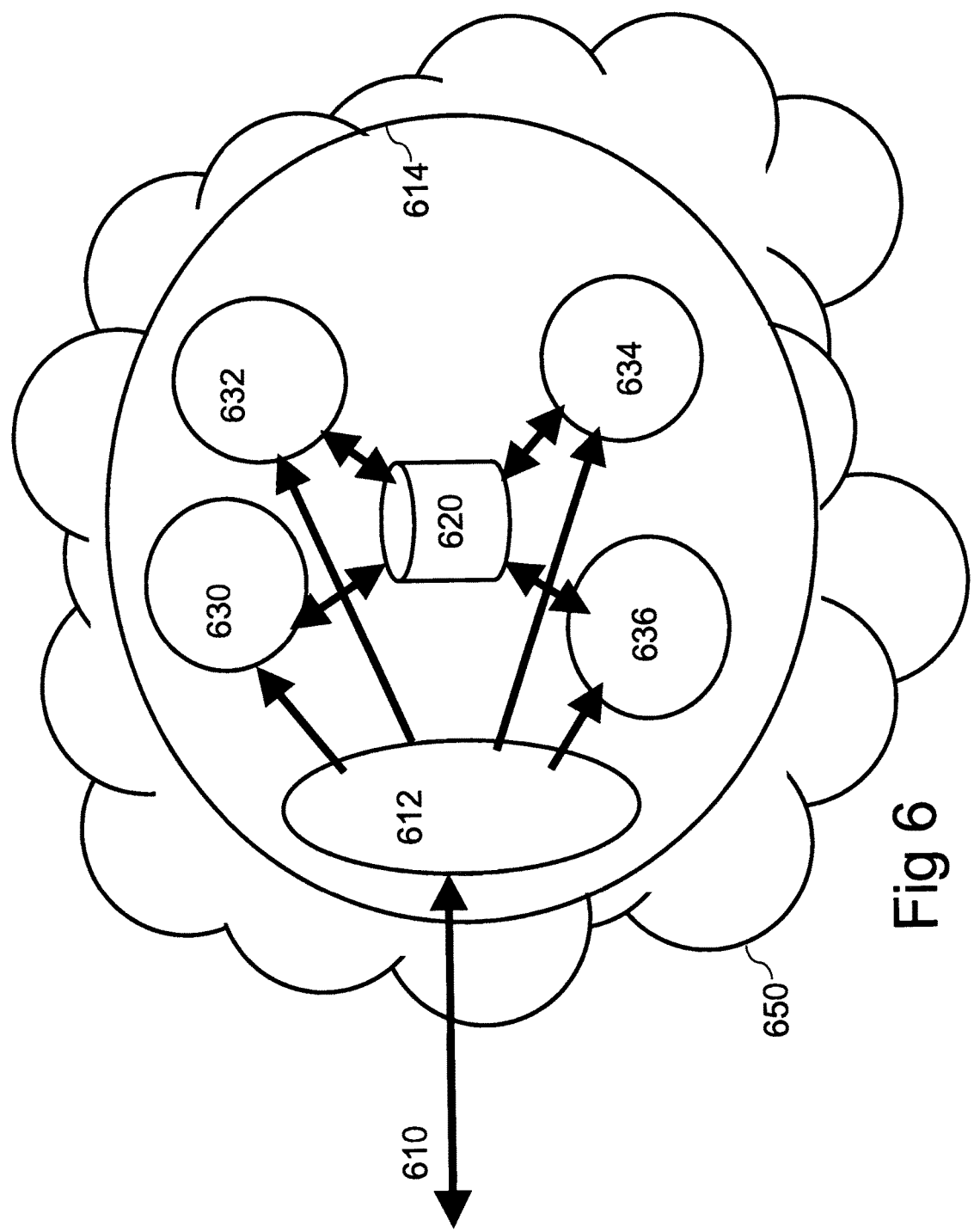
FIG. 6 is a schematic illustrating an alternate overview of a the cloud computing system, according to some embodiments.

An alternative embodiment of FIG. 1 is depicted in FIG. 6. In this embodiment, the APIs 610 are used to communicate to the cloud 650 through a distributing load balancer 612. The load balancer 612 distributes services to different CRs 630 which are each in communication with a DDS 620. A DC Messaging Service 614 coordinates the communication among the DDSs, CRs and the Load Balancer 612 on the cloud 650 and among clouds.

Multiple Clouds

References in this disclosure to a "cloud," "clouds," or a "cloud environment," should be understood to encompass one cloud but also but any combination of cloud resources. For instance, CSF can utilize not only one cloud to run CRs, but numerous clouds, both public and private.

Private clouds can work in concert among one another, and also link to a public cloud. This arrangement can provide security options to developers and cloud administrators.

Cloud resources can be networked together seamlessly by CSF. This is because logistics of cloud resources including cloud resource management, can all be programmed into the CSSs. This allows users to utilize cloud resources without even being aware of what cloud they are utilizing.

Security

Permissions can be applied on each cloud service individually by the cloud administrator. Users can view, list, add, or delete permissions.

All CRs that are instantiated are completely isolated by firewalls.

Security rules can be dynamically applied to the CRs. For example, Cloud Services Controllers can selectively open ports via APIs for exposing only a specific service.

Each Controller can run inside its own isolated OS container or VM.

All API calls are encrypted using Secure Socket Layer (SSL) certificates.

Third Party Feature Addition

Cloud computing presents a vast set of resources for utilization. Therefore, it makes sense to open the management of the cloud services to as many entities as possible, in order to develop the best management tools for those resources. Therefore, CSF allows for the maximum participation by users in adding to, adapting and enhancing the cloud services available.

CSF does this by allowing users and Third Party developers to add their own cloud features or services. This effectively allows other Third Party users and developers to extend the cloud in any way they see fit.

New Cloud Services can be added via the RESTful API, RESTful API/http, CLI and UI dynamically and they will be available for immediate use.

CONCLUSION

The foregoing description, for purpose of explanation, has been described with reference to specific examples. However, the illustrative discussions above are not intended to be exhaustive or to limit the invention to the precise forms disclosed. Many modifications and variations are possible in view of the above teachings. This includes practicing the examples of the various subject matter described above in any combination. The examples were chosen and described in order to best explain the principles of the invention and its practical applications, to thereby enable others skilled in the art to best utilize the inventions with various modifications as are suited to the particular use contemplated.

As disclosed herein, features consistent with the present inventions may be implemented via computer-hardware, software and/or firmware. For example, the systems and methods disclosed herein may be embodied in various forms including, for example, a data processor, such as a computer that also includes a database, digital electronic circuitry, firmware, software, computer networks, servers, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for managing computer resources in a cloud environment, the method comprising:

receiving, by a site service manager, a request from a user for a service;

presenting, by the site service manager, one or more parameters to the user based on a specification for the service, wherein the specification for the service is defined by the one or more parameters that specify how the service is to be instantiated;

receiving, by the site service manager, one or more parameter values from the user, the one or more parameter values corresponding to the one or more parameters of the specification for the service;

assigning, by the site service manager, the one or more parameter values to a cloud service manager of a plurality of cloud service managers using an identifier for the one or more parameter values;

validating, by the cloud services manager, the one or more parameters values for the one or more parameters;

upon validating the one or more parameter values, executing, by the cloud services manager, the service based upon the one or more values, the cloud services manager comprising a framework providing a set of application programming interfaces (APIs) usable by a controller, wherein the executing the service comprises instantiating, by the controller using one or more APIs from the set of APIs, the service using a set of one or more computational resources (CRs) for the service according to the one or more parameter values;

monitoring, by the controller using one or more APIs from the set of APIs, the service; and upon determining, by the controller, that a particular threshold is met for the service, causing, by the controller using one or more APIs from the set of APIs, a new CR to be created for the first service or a CR to be removed from the set of one or more CRs for the first service.

2. The method of claim 1, wherein the one or more CRs include a physical computational device, a storage service, a networking service, a higher level application, or a combination thereof.

3. The method of claim 1, wherein the instantiating the service comprises:
   starting, by the controller using one or more APIs from the set of APIs, a daemon on the set of one or more CRs;
   upon the daemon being started, loading the set of one or more CRs to the cloud environment and assigning a handle to the set of one or more CRs within the cloud environment; and
   configuring, by the controller using one or more APIs from the set of APIs and the handle, the set of one or more CRs to provide the service according to the one or more parameter values.

4. The method of claim 3, wherein the one or more parameters are labeled such that the user can recognize what is required for each of the one or more parameters.

5. The method of claim 3, wherein the configuring the set of one or more CRs includes populating in an API, a Command Line Interface (CLI), and a User Interface (UI) as a new feature or extension for the service so end users can recognize and use the service.

6. A system for managing computer resources in a cloud environment, the system comprising:
   one or more processors; and
   a memory coupled to the one or more processors, the memory storing a plurality of instructions executable by the one or more processors, the plurality of instructions comprising instructions that when executed by the one or more processors cause the one or more processors to perform processing comprising:
      receiving a request from a user for a service;
      presenting one or more parameters to the user based on a specification for the service, wherein the specification for the service is defined by the one or more parameters that specify how the service is to be instantiated;
      receiving one or more parameter values from the user, the one or more parameter values corresponding to the one or more parameters of the specification for the service; and
      assigning the one or more parameter values to a cloud service manager of a plurality of cloud service managers using an identifier for the one or more parameter;
      validating the one or more parameters values for the one or more parameters;
      upon validating the one or more parameter values, executing the service based upon the one or more values in a framework that provides a set of application programming interfaces (APIs) usable by a controller, wherein the executing the service comprises instantiating, by the controller using one or more APIs from the set of APIs, the service using a set of one or more computational resources (CRs) for the service according to the one or more parameter values;
      monitoring the service; and
      upon determining that a particular threshold is met for the service, causing a new CR to be created for the first service or a CR to be removed from the set of one or more CRs for the first service.

7. The system of claim 6, wherein the one or more CRs include a Virtual Machine, a physical computational device, a storage service, a networking service, a higher level application, or a combination thereof.

8. The system of claim 6, wherein the instantiating the service comprises:
   starting a daemon on the set of one or more CRs;
   upon the daemon being started, loading the set of one or more CRs to the cloud environment and assigning a handle to the set of one or more CRs within the cloud environment; and
   configuring the set of one or more CRs to provide the service according to the one or more parameter values.

9. The method of claim 8, wherein the one or more parameters are labeled such that the user can recognize what is required for each of the one or more parameters.

10. The method of claim 8, wherein the configuring the set of one or more CRs includes populating in an API, a Command Line Interface (CLI), and a User Interface (UI) as a new feature or extension for the service so end users can recognize and use the service.

11. A non-transitory computer-readable medium storing one or more instructions that, upon execution by one or more processors of a services manager in a cloud computing system, causes the one or more processors to:
   receive, at a site service manager, a request from a user for a service;
   present one or more parameters to the user based on a specification for the service, wherein the specification for the service is defined by the one or more parameters that specify how the service is to be instantiated;
   receive, at the site service manager, one or more parameter values from the user, the one or more parameter values corresponding to the one or more parameters of the specification for the service;
   assign the one or more parameter values to a cloud service manager of a plurality of cloud service managers using an identifier for the one or more parameter values;
   validate the one or more parameters values for the one or more parameters;
   upon validating the one or more parameter values, executing, at the cloud services manager, the service based upon the one or more values, the cloud services manager comprising a framework providing a set of application programming interfaces (APIs) usable by a controller, wherein the executing the service comprises instantiating, by the controller using one or more APIs from the set of APIs, the service using a set of one or more computational resources (CRs) for the service according to the one or more parameter values;
   monitor, using one or more APIs from the set of APIs, the service; and
   upon determining that a particular threshold is met for the service, cause, by the controller using one or more APIs from the set of APIs, a new CR to be created for the first service or a CR to be removed from the set of one or more CRs for the first service.

12. The non-transitory computer-readable medium of claim 11 wherein the one or more CRs include includes a Virtual Machine, a physical computational device, a storage service, a networking service, a higher level application, or a combination thereof.

13. The non-transitory computer-readable medium of claim 11, wherein the instantiating the service comprises:
   starting, by the controller using one or more APIs from the set of APIs, a daemon on the set of one or more CRs;

upon the daemon being started, loading the set of one or more CRs to the cloud environment and assigning a handle to the set of one or more CRs within the cloud environment; and configuring, by the controller using one or more APIs from the set of APIs and the handle, the set of one or more CRs to provide the service according to the one or more parameter values.

14. The non-transitory computer-readable medium of claim 13, wherein the one or more parameters are labeled such that the user can recognize what is required for each of the one or more parameters.

15. The non-transitory computer-readable medium of claim 13, wherein the configuring the set of one or more CRs includes populating in an API, a Command Line Interface (CLI), and a User Interface (UI) as a new feature or extension for the service so end users can recognize and use the service.

* * * * *